Figure 1:
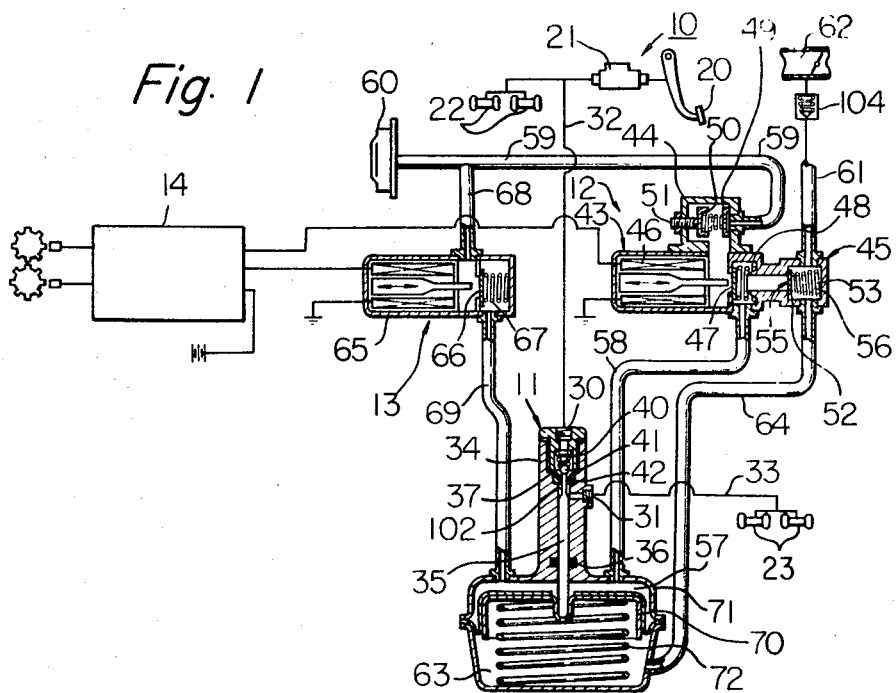

United States Patent

[11] 3,602,554

[72] Inventors Hirohisa Ichimura
Yokohama;
Hiroshi Sugiyama, Hiratsuka; Kazuyuki Oride; Masaaki Morita, Yokosuka, all of, Japan
[21] Appl. No. 849,338
[22] Filed Aug. 12, 1969
[45] Patented Aug. 31, 1971
[73] Assignee Nissan Motor Company, Limited
Kanagawa-ku, Yokohama, Japan
[32] Priority Aug. 22, 1968, Nov. 30, 1968
[33] Japan
[31] 43/59556 and 43/87396

[54] ANTISKID DEVICE
12 Claims, 12 Drawing Figs.
[52] U.S. Cl. .................................................. 303/21 AF,
188/181 A, 303/20, 303/21 EB, 303/21 F
[51] Int. Cl. ............................................................ B60t 8/12

[50] Field of Search .......................................... 188/181 A,
181 C, 181 T; 235/152, 153; 303/21; 307/29;
137/47, 48, 85

[56] References Cited
UNITED STATES PATENTS
3,414,336  12/1968  Atkin et al. .................... 303/21 (F)
3,512,844  5/1970  Stelzer ........................... 188/181 (A)
3,516,715  6/1970  Fielek, Jr., et al ............. 303/21

Primary Examiner—Milton Buchler
Assistant Examiner—Stephen G. Kunin
Attorney—John Lezdey ABSTRACT: An antiskid device for a braking oil system in an automotive vehicle having braking means, hydraulic pressure control means, air pressure control means, solenoid valve means, and skid signal detecting means for preventing a skid of vehicle wheels by reducing the braking oil pressure when the deceleration of the wheels reaches a predetermined value as measured by an electric pickup means.

ANTISKID DEVICE

This invention relates to an antiskid device for the braking oil system in an automobile.

The antiskid device generally comprises a braking oil circuit including a master cylinder for oil pressure source, wheel cylinders, conduits connected between the source and wheel cylinders, a vacuum source; and electrical means for detecting the deceleration of the wheels wherein when the deceleration of the wheel reaches a predetermined value the barking oil pressure is reduced by the operation of the oil pressure control circuit to prevent the skid of the wheels. This invention contemplates to improve the device by providing an optimum release and reset of the braking oil pressure actuating the wheel cylinders of the wheels with two stage detectors of the angular deceleration of the wheels. In order to accomplish this, an object of the present invention is to provide an antiskid device in which a skid may be detected when the deceleration of wheels reaches a predetermined value at one of the two sides by means of the difference of the decelerations of the wheels on either side when a skid of the automobile occurs, and in which a skid signal is continued if either of the deceleration rates is over a predetermined angular deceleration rate even though the other decreases below a predetermined value while the skid begins to be overcome.

This invention also intends to provide a safety device for relieving the passage of the braking oil even when the aforementioned antiskid device is defective.

The aforesaid antiskid device comprising a vacuum source in the braking oil circuit adopts a diaphragm assembly which operates in response to the difference between the atmospheric pressure and vacuum in the braking oil circuit so as to control the opening of a valve with the result that if the valve body is defective or the spring provided within the diaphragm assembly is broken causing the antiskid device to become inoperative, so that the reduced braking oil pressure for preventing the skid cannot be reset to the original pressure. In such a case, even if the braking pedal is being depressed the braking action cannot be effected due to unsatisfactory actuation of the oil pressure to the wheel cylinders causing a very dangerous situation in the operation of the automobile.

In order to eliminate the aforementioned disadvantages of the antiskid device, the present invention also provides a safety device for an antiskid device in which a bypass valve is provided in a passage of the braking oil so as to detect the defects of the antiskid device and to warn of the defects and at the same time another passage of the braking oil is formed by opening the bypass valve so that the braking oil pressure may be applied to the wheel cylinders even if the antiskid device is inoperative.

Figure 2:
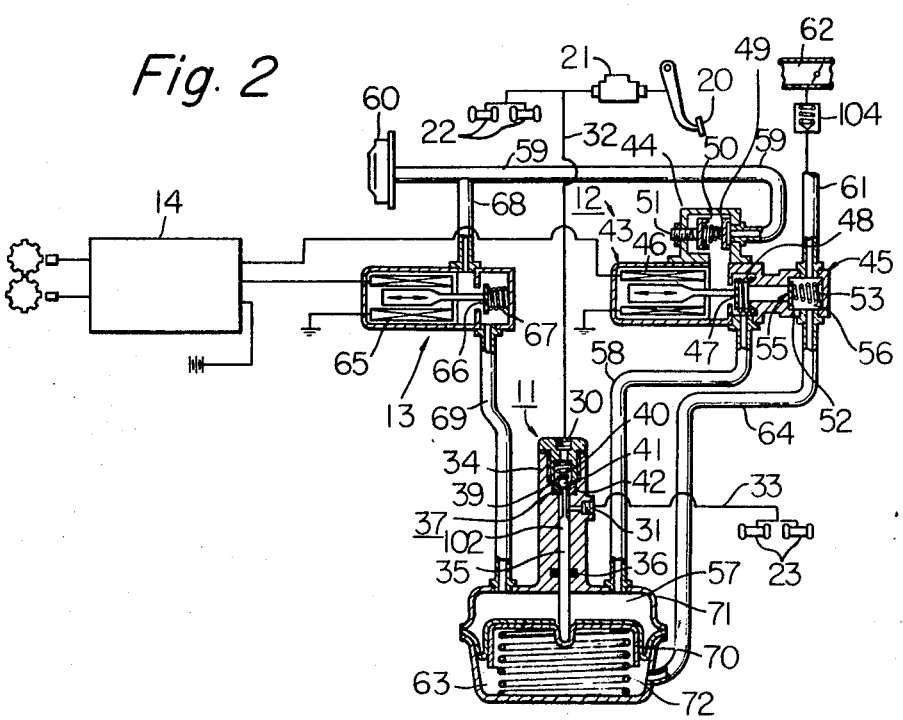
Figure 3:
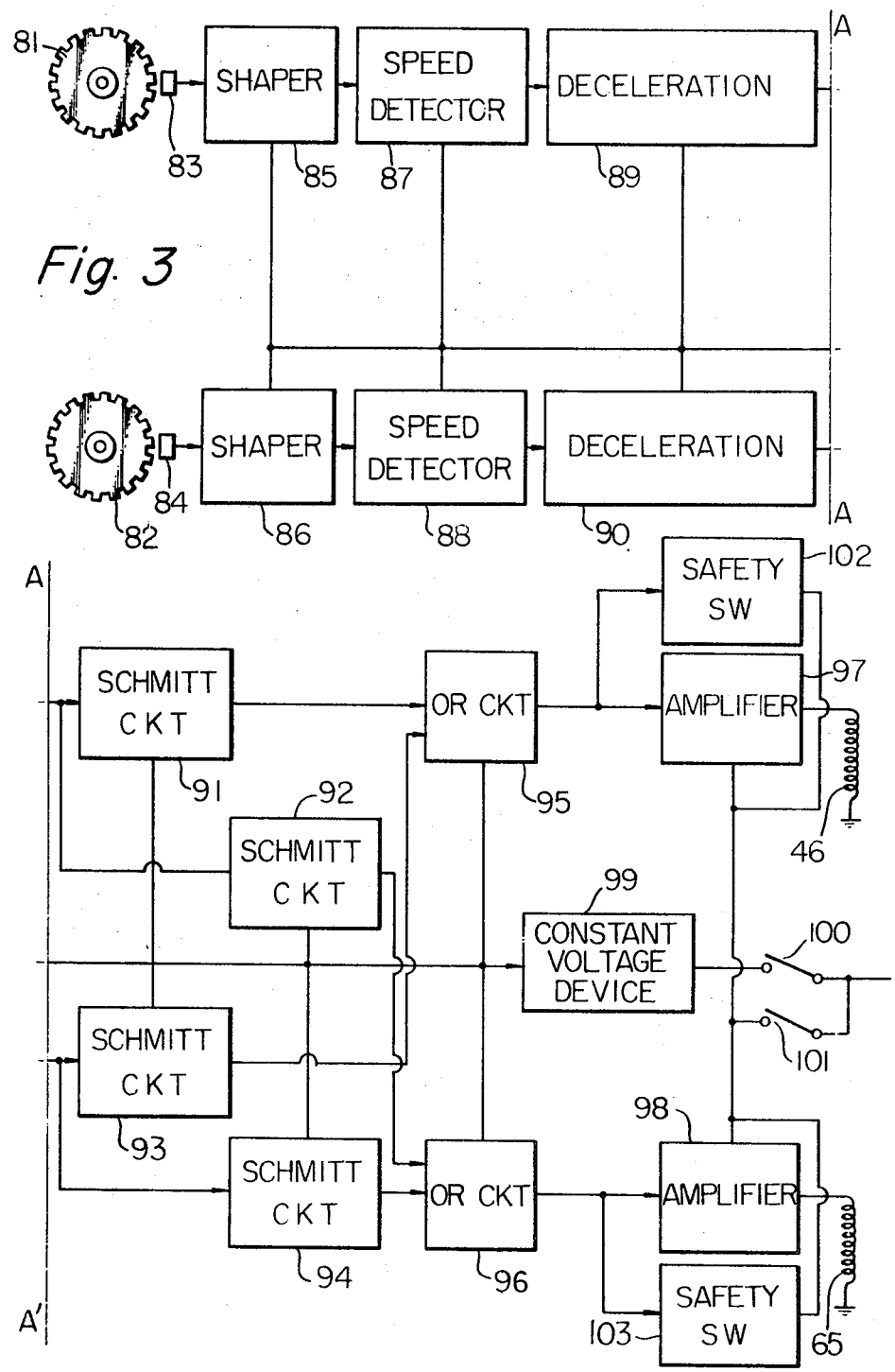
Figure 4:
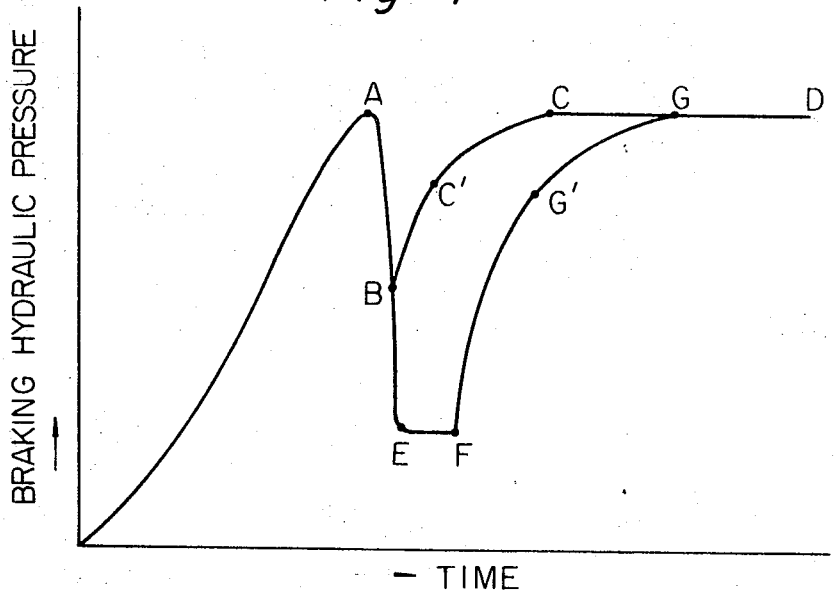
Figure 5:
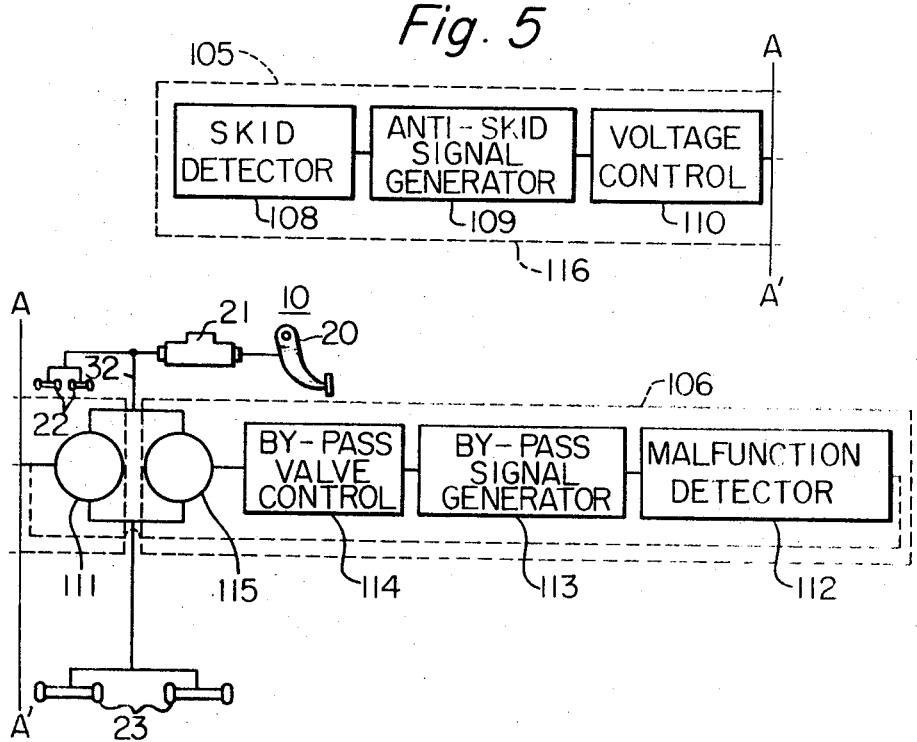
Figure 6:
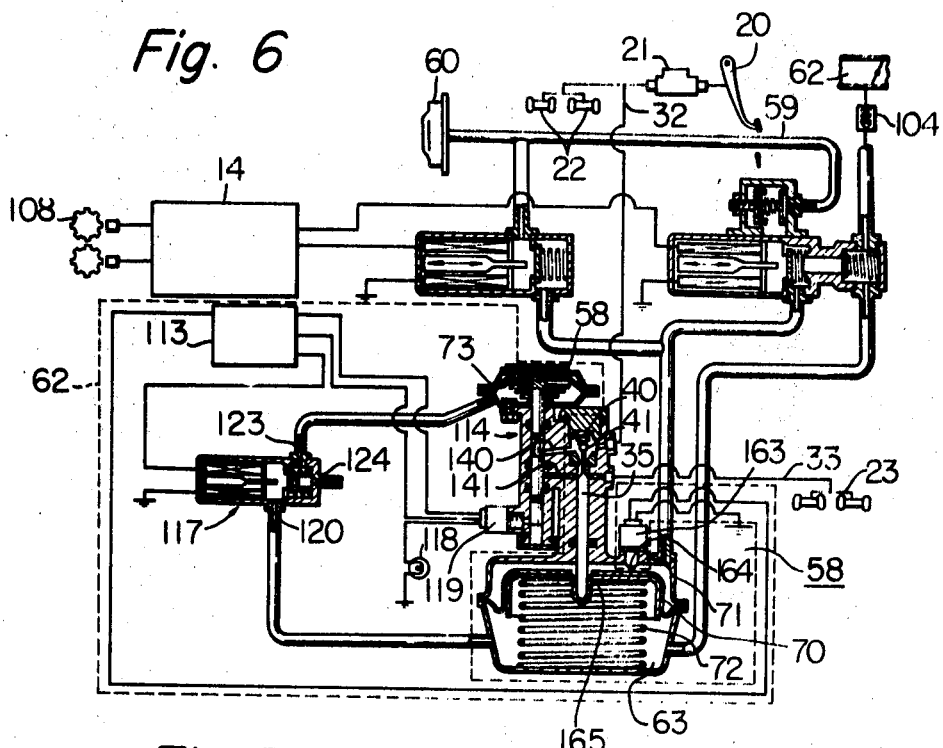
Figure 7:
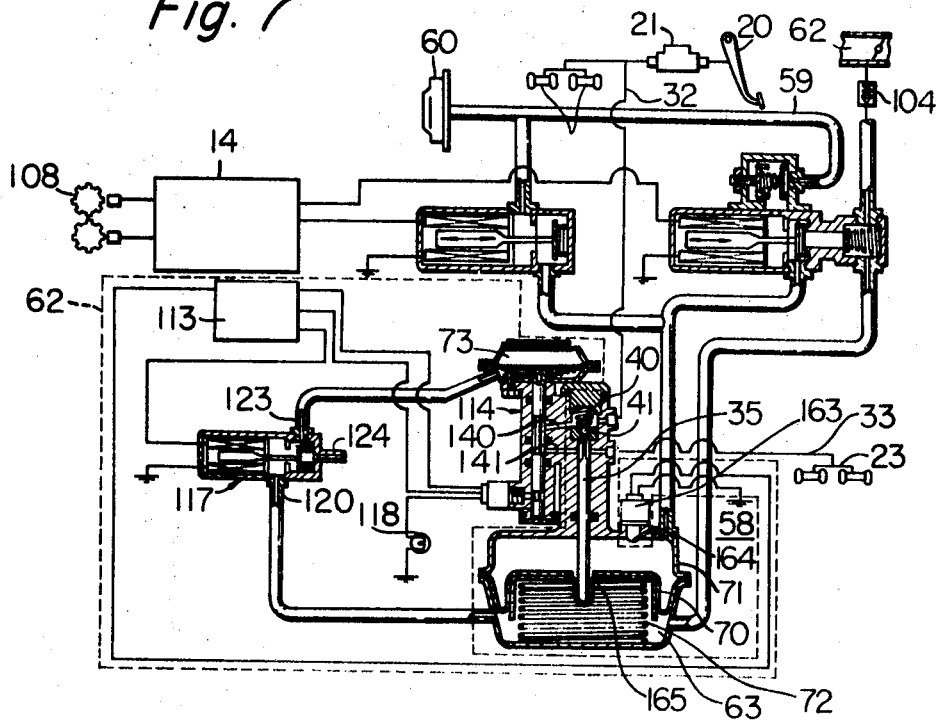
Figure 8:
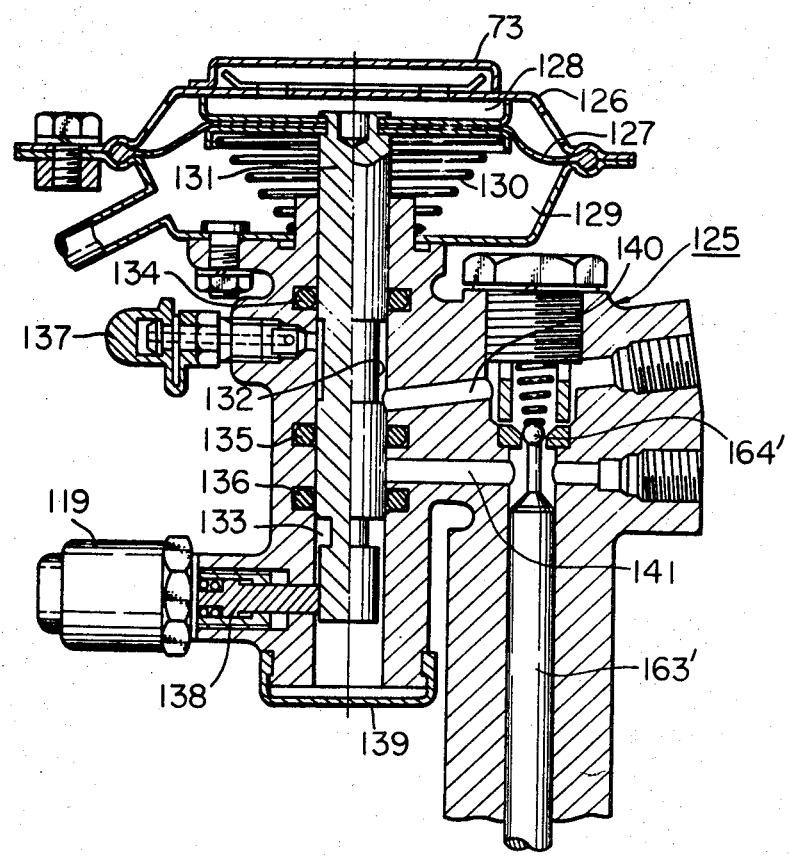
Figure 9:
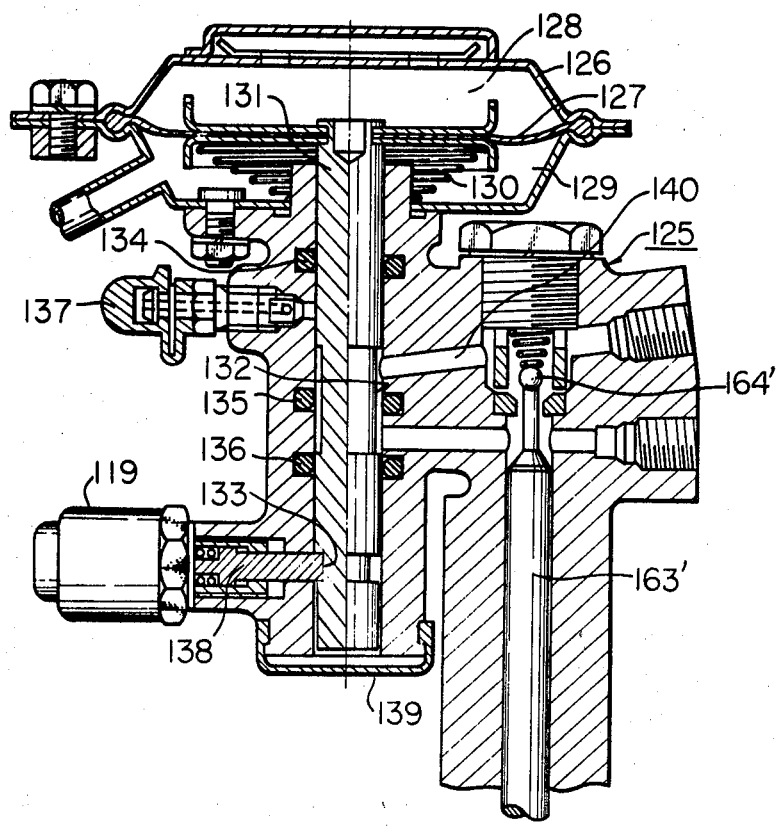
Figure 10:
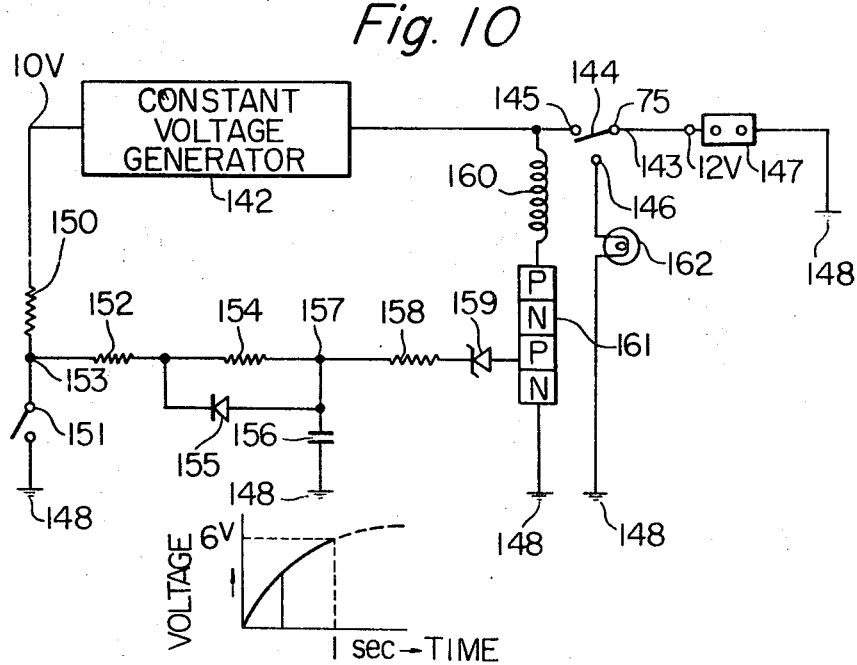

The features and advantages of the present invention will become apparent from the following description taken in conjunction with the accompanying drawings, in which:

FIGS. 1 and 2 are schematic diagrams of an antiskid device according to the present invention, FIG. 3 is a block diagram of a skid signal detecting means by detecting the rotation of the wheels on both sides, FIG. 4 is a graphical representation of the relationship between the braking oil pressure and time in the braking oil circuit, FIG. 5 is a block diagram of an antiskid device with a safety device in a braking oil pressure system in accordance with the present invention, FIGS. 6 and 7 are views of another embodiment of the safety device attached to the braking oil pressure system and antiskid means, FIGS. 8 and 9 are views of a bypass valve control means, a switch and a pressure control valve as assembled for the present antiskid device, FIG. 10 is a wiring diagram of the bypass signal generating means shown in FIGS. 1, 2 and 3, FIGS. 11 and 12 are views of another alternate of the bypass valve control means as used in the present antiskid device.

Reference is now made to FIGS. 1 and 2, which show schematic diagrams of an antiskid device according to the present invention, which device comprises braking means 10, hydraulic pressure control means 11, air pressure control means 12, solenoid valve means 13, and a skid-detecting signal means 14.

The braking means 10 comprises a brake pedal 20, a master cylinder 21, front wheel cylinders 22, rear wheel cylinders 23.

The hydraulic pressure control means 11 comprises a braking oil inlet 30 and a braking oil outlet 31, said inlet 30 being connected through the conduit 32 with the master cylinder 21, and the outlet 31 being connected through the conduit 33 with the rear wheel cylinders 23. The master cylinder 21 is actuated by means of the brake pedal 20 and the braking oil delivered therefrom is fed to the front wheel cylinders 22 and to the rear wheel cylinders 23 through the hydraulic pressure control means 11.

A body 34 of the hydraulic control means 11 has a plunger 35 to which an oil seal 36 is attached in order to prevent the oil from leaking.

Braking oil is fed from the master cylinder 21 through the conduit 32, a check valve 37, and a conduit 33 into the rear wheel cylinders 23. The check valve 37 comprises an inlet 30, a spring 40, a ball valve 41 and a ball valve seat 42.

The air pressure control means 12 comprises a solenoid valve 43, a relief valve 44 and a relief valve 45. The solenoid valve 43 comprises a solenoid coil 46, a valve 47 and a spring 48. The relief valve 44 comprises a valve 49, a spring 50 and a spring adjusting screw 51. The relief valve 45 comprises a valve 52 and a spring 53. The valve 52 comprises an orifice 55 for the purpose which will be hereinafter described.

The spring chamber 56 of the solenoid valve 43 is connected to an air chamber 57 of the hydraulic pressure control means 11 through a conduit 58. The relief valve 44 is mounted adjacent to the solenoid valve 43 and is connected through a conduit 59 and an air cleaner 60 to the atmosphere. The relief valve 45 is connected to an intake manifold 62 of the engine through a conduit 61 and with a vacuum chamber 63 through a conduit 64. It follows that the vacuum chamber 63 will always maintain a certain constant vacuum such as, for example, −500 mm. Hg.

The solenoid valve 13 comprises a solenoid coil 65, a valve 66 and a spring 67. The solenoid valve 13 is connected to the air cleaner 60 through a conduit 68 and is also connected to the air chamber 57 of the oil pressure control means 11 through a conduit 69. If the solenoid coil 65 is energized, the valve 66 moves rightwards against the tension of the spring 67 in FIG. 1 with the result that the atmospheric pressure is conducted through the air cleaner 60, conduit 68, valve 66 and conduit 69 into the air chamber 57.

The vacuum chamber 63 is separated from the air chamber 57 by means of a diaphragm 70 in a diaphragm chamber 71. The diaphragm 70 is mounted adjacent to the plunger 35 so that it is normally urged upward by means of a spring 72 in the drawing.

In FIG. 3, the skid signal detecting means 14 for detecting the rotation of right and left-hand wheels as pulses comprises two rotors 81, 82 on which teeth are provided, two electromagnetic pickup means 83, 84, two shapers 85, 86, two speed detecting means 87, 88, deceleration detecting means 89, 90, two Schmitt circuit means 91, 92 for the right-hand wheels, two Schmitt circuit means 93, 94 for the left-hand wheels, an OR circuit means 95 for the low deceleration detecting means for setting the low deceleration ratio, an OR circuit means 96 for high deceleration detecting means for setting the high deceleration ratio, a power-amplifying means 97 for the low deceleration ratio, a power-amplifying means 98 for the high deceleration ratio, a constant voltage means 99, the solenoid coil 46 for the low deceleration ratio, the solenoid coil 65 for the high deceleration ratio, an ignition switch 100, stop lamp switch 101, right and left safety switches 102 and 103.

In operation, while the automobile is running, the electromagnetic pickup means 83, 84 generate pulses such as 90 pulses per one revolution of the wheel. The pulses generated at the pickup means 83, 84 are fed to the shapers 85, 86 so as to form square electrical waves in response to the pulses derived therefrom. The square waves from the shapers 85, 86 are fed to the speed detecting means 87, 88 so as to integrate them to produce voltages proportional to the speeds of the wheels, respectively. These voltages derived from the speed detecting means to differentiate them to detect the rates of the speed changes to produce voltages proportional to the deceleration rates. The latter voltages are fed to the Schmitt circuit means 91, 92 and 93, 94, respectively.

In these Schmitt circuit means, Schmitt 91, 93 generate certain predetermined voltages when they receive the voltages corresponding to 20 rad./sec$^2$, while Schmitt 92, 94 produce certain predetermined voltages when they receive the voltages corresponding to 30 rad./sec$^2$.

The OR circuit means 95 receives the output from the Schmitt circuits 91, 93 so that when either output reaches a predetermined value it produces its output, and the OR circuit means 96 receives the outputs from the Schmitt circuits 92, 94 so that when either output reaches a predetermined value it generates its output. On the other hand, when both deceleration ratios decrease to below predetermined values, their output voltages become zero.

The output derived from the OR circuit 95 is fed to the power amplifier 97 amplifying it to cause the solenoid coil 46 to be energized by the output current from the power amplifier 97, while the output derived from the OR circuit 96 is fed to the power amplifier 98 so as to amplify it to cause the solenoid coil 65 to be energized by the output current from the power amplifier 98.

The safety switches 102, 103 operate to shut off the currents flowing through the solenoid coils 46, 65 preventing the solenoid coils 46, 65 from letting currents therethrough due to the diaphragm lowering to cause the braking oil pressure to continue to reduce to lose its braking action when the power amplifiers 97, 98 are in trouble, respectively.

When the deceleration of the wheel reaches 20 rad./sec$^2$, the solenoid valve 43 operates to move the valve 47 rightwards in FIG. 1 with the result that the air chamber 57 is shut off from the air intake manifold 62. Thus the air pressure in the air chamber 57 is regulated (lower than the atmospheric pressure) because the air delivered from the air cleaner 60 through the conduit 59 urges the valve 49 leftwards against the tension of the spring 50. On the other hand, the vacuum chamber 63 is connected to the intake manifold 62 of the engine through a check valve 104 with the result that the pressure in the vacuum chamber is kept constant. It follows that the diaphragm 70 moves downward in the drawing against the tension of the spring 72 due to the pressure difference between the air chamber 57 and the vacuum chamber 63 so that the plunger 35 mounted adjacent thereto moves downward (FIGS. 1, 2) with the result that the check valve 41 contacts with the valve seat 42, the braking oil to the wheel cylinders 23 of the rear wheels is shut off, the volume of an oil chamber 39 increases because the plunger 35 moves downward (FIGS. 1, 2), and the braking oil pressure reduces to release the skid of the rear wheel as shown by the curve AB in FIG. 4.

When the decelerations of the wheels reach a predetermined value such as less than 20 rad./sec$^2$, the solenoid 43 is deenergized so that the valve 47 returns to its left position in the drawings, the air chamber 57 is shut off from the air cleaner 60, whilst the valve 52 moves rightwards against the tension of the spring 53 in the drawings with the result that the air within the air chamber 57 is released to the intake manifold side. In this case, assuming that the valve 52 of the relief valve 45 closes again when a pressure difference such as 100 mm. Hg exists, the braking oil pressure increases as shown by the curve BC'. When the oil pressure reaches the point designated by C' in FIG. 4, the valve 52 closes and the air passes gradually through the orifice 55. As a result, the braking oil pressure returns gradually to normal as illustrated by the line C'CD in FIG. 4, because the check ball 41 gradually separates from the valve seat 42.

When the angular decelerations of the wheels are relatively large such as over 30 rad./sec$^2$, the solenoid coil 65 is energized, whereupon the valve 66 moves rightwards in the drawings so that the air is led from the air cleaner 60 through the conduit 68, valve 66 and conduit 69 into the air chamber 57. In this case, the atmospheric pressure acts directly on the diaphragm 70 and the plunger 35 moves lower tan in low decelerations of the wheels with the result that since the passage filled with braking oil and volume of the oil chamber 102 increase the pressure in the wheel cylinders 23 decreases sharply as shown by the curve ABEF in FIG. 4.

When the skid signal to the solenoid valve 13 is shut off it stops to operate and the valve 66 closes. Further, when the skid signal to the solenoid valve 43 is shut off, the valve 47 closes so that the air in the air chamber 57 is exhausted through the conduit 58, and relief valve 45 into the intake manifold. In this case, the braking oil pressure changes as illustrated by the line FG'GD in FIG. 4.

The relief valve 43 is provided for the reason that since the braking oil pressure is reset as the skid is released, it is gradually reset on its way so as to prevent it from shocking together with preventing the reduction of the braking oil pressure and repeated operation of the returning, thereby decreasing the wheel stopping distance.

It is understood from the foregoing description that the present invention provides the detection of the angular deceleration of both the right and left-hand wheels with the result that positive operation may be effected even when skidding of the wheels of either side occurs. Thus, one advantage of the present invention is, that the safety of the automobile against skidding is improved.

Reference is now made to FIG. 5, which shows a block diagram of an antiskid device with a safety device in the braking oil pressure system according to the present invention as another embodiment thereof, which system comprises braking means 10, an antiskid means 105, and safety means 106.

The braking means 10 comprises a brake pedal 20, a master cylinder 21, front wheel cylinders 22, rear wheel cylinders 23, and a conduit 32 connected therebetween.

The antiskid means 105 comprises a skid detector 108, antiskid signal generating means 109, voltage control means 110 and pressure control valve 111.

The safety means 106 comprises malfunction detecting means 112, bypass signal generating means 113, bypass valve control means 114 and bypass valve 115, which is normally closed.

In operation, the bypass valve 115 is normally closed so that when the pedal 20 is pressed the oil pressure is fed through a conduit 32, pressure control valve 111 into the wheel cylinder 23 to effect braking action. However, if the deceleration of the wheel becomes a predetermined value by depressing abruptly the brake pedal 20, antiskid signal-generating means 109 generates an antiskid signal, which energizes the valve control means 110 so that it closes the pressure control valve 111, whereupon the oil pressure to be fed to the wheel cylinder 23 is reduced so as to prevent the skid of the wheel.

If the deceleration of the wheel is reduced below a predetermined value, which value is that the antiskid device operates, it stops to operate to cause the oil pressure to return to the original value.

When the antiskid device is defected, the oil pressure fed to the wheel cylinder 23 does not return to the original even if the deceleration is decreased. It means that even if the brake pedal 20 is being depressed sufficient oil pressure cannot be applied to the wheel cylinder 23 so that the braking action is not effected. In order to overcome the disadvantage, the present invention provides safety means 106 which detects the trouble of the antiskid device, and which opens the bypass valve 115 by the bypass signal so as to from another oil passage thereby enabling of braking even though the antiskid device is in trouble.

The safety means starts to operate when the trouble of the antiskid device 105 is detected through a line as designated by a broken line 116 in FIG. 5. It follows that the trouble is detected when the oil pressure is kept decreased over a predetermined period. That is, if the oil pressure has not returned to the original value after a predetermined period, the malfunction detecting means 112 energizes the bypass signal generating means 113 to generate the bypass signal which energizes the valve control means 114 so as to open the bypass valve 115, whereupon the oil pressure is fed through the valve 115 to the wheel cylinder 23 thereby enabling of braking.

Reference is now made to FIGS. 6 and 7, which show another embodiment of the safety device attached to the braking oil pressure system and antiskid means, which safety device 106 comprises the malfunction detecting means or switch 112, bypass signal generating means 113, bypass valve 115 and its control means 114, solenoid valve 117, warning lamp 118 and switch 119. The malfunction detecting switch 112, solenoid valve 117, switch 119 and warning lamp 118 are electrically connnected with the bypass signal-generating means 113, respectively, a first port 120 of the solenoid valve 117 is connected to the vacuum chamber 63, a second port 123 connected to the valve control means 114, and a third port 124 connected to the atmosphere.

Reference is now made to FIGS. 8 and 9, which show the bypass valve control means 114, switch 119 and pressure control valve 125, in which the bypass valve control means 114 comprises a diaphragm chamber 126 including a diaphragm 127 which divides the chamber into two diaphragm chambers, the air chamber 128 and the vacuum chamber 129, a spring 130 for biasing the diaphragm 127 upwardly, a plunger 131 moving vertically with the diaphragm 127, on which plunger 131 recesses 132 and 133 are formed; a plurality of oil seals 134, 135 and 136 for preventing oil from leaking, an air bleed 137 for preventing air from mixing into oil, a locking pin 138, dust cover 139, and conduits 140, 141 for connecting the pressure control valve 125 with the bypass valve.

In operation of the valve control means 114, when both the air chamber 128 and vacuum chamber 129 are connected to the atmosphere, the diaphragm 127 is urged upwards in the drawing by means of the tension of the spring 130 so that the conduit 140 is not connected to the conduit 141.

When the vacuum chamber 129 is evacuated by a vacuum source (not shown), the diaphragm 127 biases downward in the drawing against the tension of the spring 130 because of the pressure difference between the air and vacuum chambers 128, 129 so that the plunger 131 moves downward in the drawing, whereupon the conduit 140 is connected to the conduit 141 through the recess 132, further, the locking pin 138 engages with the recess 133 so that the switch 119 is cut off.

Reference is now made to FIG. 10, which shows a wiring diagram of the bypass signal generating means 113 shown in FIG. 5, which generating means 113 comprises a switch 119 including first terminal 143, an arm 144 connected with the first terminal 143, second terminal 145 and third terminal 146, a source of DC power 147 connected between the terminal 143 of the switch 119 and ground 148, a constant voltage means 142 connected at one end with the terminal 145 of the switch 119, first resistor element 150 for voltage drop between the constant voltage means 142 and the ground 148, a switch 151 connected between the resistor element 150 and ground 148, a second resistor element 152 connected at one end between the connecting point 153 of the first resistor 150 and switch 151, a third resistor element 154 and a diode 155 connected in parallel with each other and both connected at one side with the resistor 152, a capacitor element 156 connected between the other connecting point 157 of the third resistor 154 and diode 155, and ground 148, a fourth resistor element 158 connected at one end with the connecting point 157, a Zener diode 159 connected with the fourth resistor 158 at the cathode side, a solenoid coil 160 connected at one end with the terminal 145 of the switch 119, PNPN silicon controlled rectifier 161, a gate of which is connected with the anode of the diode 159, another anode of which is connected with the solenoid coil 160 at the other end, and cathode of which is connected with the ground 148, a warning lamp 162 connected between the terminal 146 and ground 148.

The potential of the DC power source may be 12 volts as commonly used in an automobile. The potential applied between the constant voltage means 142 and the ground 148 may be 10 volts. The switch 151 may be a normally closed switch.

In operation, since the switch 151 is normally closed, the connecting point 153 is grounded to be of zero voltage. If the switch 151 is opened, the capacitor 156 starts to charge through the resistors 150, 152, and 154. Assuming that the time constants of the resistors 150, 152 and 154, and capacitor 156 is properly selected, the potential at the connecting point 157 grows as shown in a graph at the bottom of FIG. 10 in such a manner that it raises to six volts 1 second after the switch 151 opens. If the switch 151 is closed within one second after it opens, the capacitor 156 discharges through the diode 155, resistor 152 and switch 119 so that the potential at the connecting point 157 does not reach six volts.

The Zener diode 159 has a characteristic to conduct at six volts applied between the diode. When approximately six volts are applied from the connecting point 157 through the fourth resistor 158 to the cathode of the diode 159, the latter conducts so that current flows through the gate of the silicon-controlled rectifier 161 with the result that the latter conducts whereby current flows through the solenoid coil 160 and actuates the solenoid valve 117.

Returning back to FIGS. 6 and 7, the operation of the safety device attached to the braking oil pressure system and antiskid means will now be described hereinafter.

If the spring 72 in the diaphragm chamber 71 is defective or the orifice of the relief valve is blocked, the diaphragm 165' cannot move upward in the drawing even though the spring 70 actuates, whereupon the plunger 35 coordinately moving with the diaphragm 70 is kept lowered so that the ball valve 164' at its end is closed. It follows that even if the brake pedal 20 is depressed oil pressure is not sufficiently applied to the wheel cylinders 23, whereupon the pin 164 of the switch 163 is extended so that the switch 163 is opened.

If the diaphragm 70 is sustained downward for over one second, the switch 151 (in FIG. 10) is opened for over one second. It means that, as previously described the silicon-controlled rectifier 161 is conducting energizing the solenoid coil 160 thereby operating the solenoid valve 73.

When the solenoid valve 73 is not operating, the port 124 is connected to the port 123 so that the vacuum chamber 129 of the valve control means 114 is connected to the air. Since the air chamber 128 is always connected to the atmosphere, the diaphragm 127 is kept raised by means of the spring 130 in the drawing.

If the solenoid valve 117 is operating, the port 120 connected to the intake manifold 165 of the engine through the vacuum chamber 122 of the diaphragm chamber 71 is also connected to the port 123, while the port 123 is not connected to the port 124. It follows that the vacuum chamber 129 of the valve control means 114 is evacuated through the ports 120, 123 by the vacuum in the intake manifold 62 and the diaphragm 127 is biased downward in the drawing against the tension of the spring 130 because of the pressure difference between the air chamber 128 and vacuum chamber 129 of the valve control means 114. As best seen in FIGS. 8 and 9, if the diaphragm 127 coordinately operating with the plunger 131 moves downward, the recess 132 moves to connect the conduits 140, 141 and the locking pin 138 engages simultaneously with the recess 133.

As best seen in FIGS. 6 and 7, if the conduit 140 is connected to the conduit 141, a bypass is formed in the oil passage which is closed by the ball valve 164', and braking oil pressure is applied to the wheel cylinder 23. If the locking pin 138 (FIGS. 8 and 9) is engaged with the recess 133, the arm 144 of the switch 119 is switched from the terminal 145 to the terminal 146 to energize the warning lamp 162, which indicates the defect of the antiskid device, but the safety device is still operating with the result that it enables braking and notifying the operator of trouble in the antiskid device.

Figure 11:
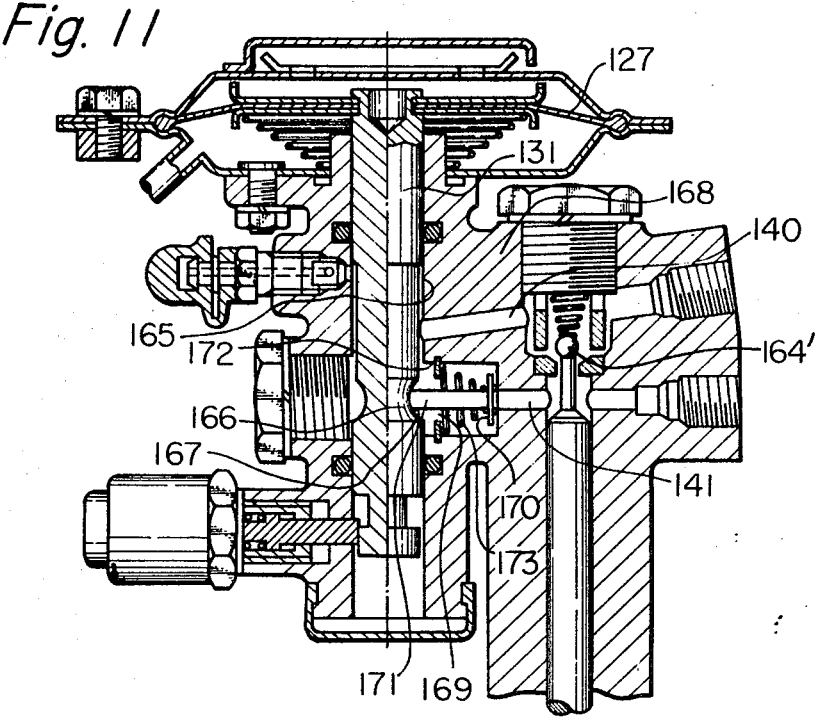
Figure 12:
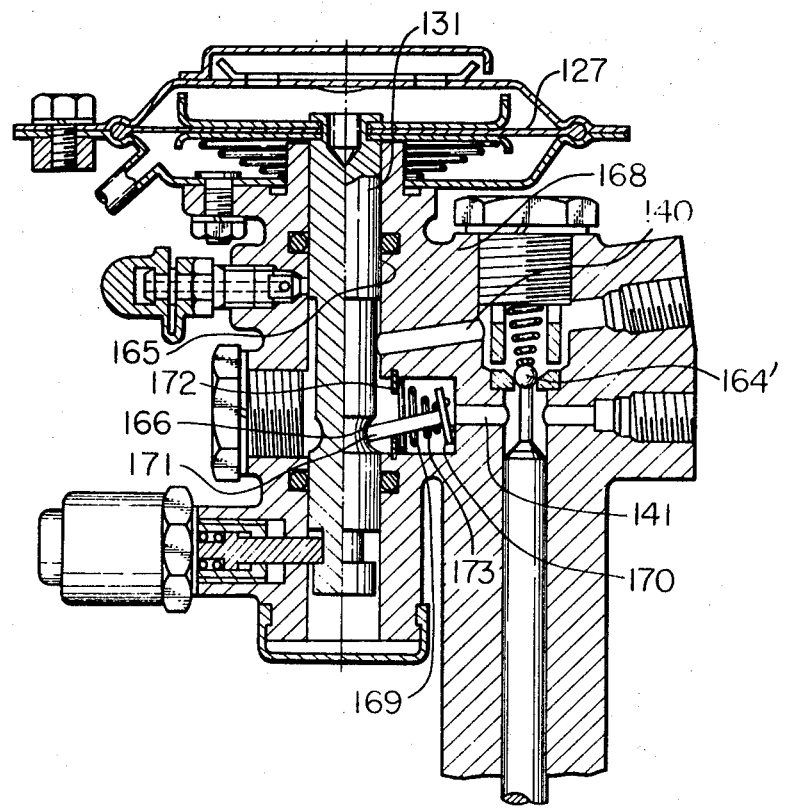

Reference is now made to FIGS. 11 and 12, which connected another alternate of the valve control means 114, which comprises the plunger thereto which has portions 165, 166 which are reduced in diameter, a valve chamber 167 formed in a body 168 of the control means 114, the conduit 140 connected with the valve chamber 167, which includes a toggle valve 169 attached thereto so that when the valve 169 opens the valve 168 is connected to the conduit 141.

The toggle valve 169 comprises a valve body 170, a valve stem 171, a snap ring 172 and a spring 173, the left end in the drawing of the valve stem 171 being engaged with the recess 166 of the plunger 131.

In operation of the aforementioned valve control means 114, when the diaphragm 127 moves down in the drawing the plunger 131 also moves down including the recess 166 thereof, whereupon the left end in the drawing of the valve stem 171 engaged with the plunger 131 at its recess 166 moves down so that the valve 170 inclines with the result that the valve chamber 167 is communicated with the conduit 141. It follows that the conduit 140 is communicated with the conduit 141 through the valve chamber 167.

It is understood that the control means 114 may provide a braking action by opening another brake oil passage if the antiskid device is defective.

It is also understood from the foregoing description that inasmuch as the bypass valve is opened if the antiskid device is defective the braking action is always available also warning the operator by the warning lamp that the antiskid device is defective.

We claim:

1. An antiskid device for a braking oil system in an automotive vehicle comprising braking means for braking front and rear wheels and including a brake pedal, a master cylinder hydraulically actuated by said brake pedal and for generating oil pressure, front and rear wheel cylinders, and conduits connected therebetween, hydraulic pressure control means for controlling the operation of said braking means and including an inlet and outlet for braking oil, said inlet being connected through a conduit with said master cylinder, said outlet being connected through a conduit with the rear wheel cylinders, a plunger having an oil seal for preventing oil from leaking, a check valve including an inlet for oil, a ball valve, a ball valve seat, and a spring for urging the valve so as to close it, and a diaphragm chamber assembly having an air chamber and a vacuum chamber, a diaphragm urged by the plunger from said air chamber to said vacuum chamber, and a spring disposed within said vacuum chamber to urge said diaphragm to said air chamber, air pressure control means for controlling the air pressure to said hydraulic pressure control means and including a solenoid valve having a solenoid coil, a valve and a spring for urging the valve to close, two relief valves each having a valve, a spring for urging said valve to close and a spring adjusting screw, the spring chamber of said solenoid valve being connected to said air chamber of said hydraulic pressure control means through a conduit, said first relief valve being mounted adjacent to said solenoid valve and connected to the atmosphere through a conduit and an air cleaner, said second relief valve being connected to an intake manifold of the engine through a conduit and with the vacuum chamber through a conduit, solenoid valve means for providing a passage between said air cleaner and said air chamber of said diaphragm chamber assembly in said hydraulic pressure control means and including a solenoid coil, a valve and a spring for urging the valve to close, and skid-detecting means for detecting the rotation of right and left-hand wheels and including two rotors on which teeth are provided, two electromagnetic pickup means each for generating pulses proportional to the revolutions of said rotors, two shapers for generating square electrical waves in response to said pulses derived from said pickup means and connected electrically therewith, two speed detecting means each for detecting the speeds of said rotors and connected electrically with said shapers, respectively, two deceleration detecting means for detecting the deceleration of said rotors, respectively, a first Schmitt circuit means for high deceleration of the right-hand wheels, a second Schmitt circuit means for low deceleration of the right-hand wheels, a third Schmitt circuit means for high deceleration of the left-hand wheels, a fourth Schmitt circuit means for low deceleration of the left-hand wheels, said first and second Schmitt circuit means being connected with said first deceleration detecting means, said third and fourth Schmitt circuit means being connected with said second deceleration detecting means, a first OR circuit means receiving the outputs from said first and third Schmitt circuit means for generating a voltage only when either output is supplied thereto, a second OR circuit means receiving the outputs from said second and fourth Schmitt circuit means for generating a voltage only when either output is supplied thereto, a first power-amplifying means receiving the output from said first OR circuit means for amplifying it, a second power-amplifying means receiving the output from said second OR circuit means for amplifying it, a constant voltage means for producing a constant voltage to all previous circuit means, a first solenoid coil connected with said first power amplifying means, a second solenoid coil connected with said second power amplifying means, a first safety switch connected in parallel with said first power amplifying means for actuating when an overload is applied to the amplifying means, a second safety switch connected in parallel with said second power amplifying means for actuating when an overload is applied to the amplifying means.

2. An antiskid device as set forth in claim 1, wherein said first and third Schmitt circuit means generate a predetermined voltage when they receive the voltage corresponding to 20 rad./sec$^2$, while said second and fourth Schmitt circuit means generate a predetermined voltage when they receive the voltage corresponding to 30 rad./sec$^2$.

3. An antiskid device as set forth in claim 1, wherein when the angular deceleration of the rotor reaches 20 rad./sec$^2$, said solenoid valve operates to shut off said air chamber from said air intake manifold whereby the air pressure in said air chamber is regulated so as to be lower than the atmospheric pressure.

4. An antiskid device as set forth in claim 1, wherein when the angular deceleration of the rotor reaches less than 20 rad./sec$^2$, said solenoid is deenergized so that said valve returns to its original position, said air chamber is shut off from said air cleaner, whilst said second valve moves against the tension of said spring whereby the air within said air chamber is released to said intake manifold.

5. An antiskid device as set forth in claim 1, wherein when the angular deceleration of said rotors reaches more than 30 rad./sec$^2$, said solenoid is energized so that said valve is actuated whereby the air is led from said air cleaner through said conduit and valve into said air chamber.

6. A combination with an antiskid device as set forth in claim 1 of safety means including:

malfunction detecting means for detecting a failure in said antiskid device in terms of a deviation of said diaphragm of said hydraulic pressure control means diaphragm from its deactuated position, bypass signal generating means connected to said malfunction detecting means for generating a bypass signal when said deviation continues for a predetermined time period;

a solenoid valve electrically connected to said bypass signal-generating means and actuated upon reception of said bypass signal;

a bypass valve for providing bypass communication between said inlet and outlet of said hydraulic pressure control means; and bypass valve control means for moving said bypass valve to a position to establish said bypass communication when actuated by said solenoid valve.

7. A combination as set forth in claim 6, wherein said bypass signal-generating means comprises a switch including
first terminal,
an arm connected with said first terminal,
second terminal and
third terminal, a source of DC power connected between said first terminal of said switch and ground, a constant voltage means connected at one end with said first terminal of said switch, first resistor element for voltage drop between the source of DC power and constant voltage means, a switch connected between said first resistor element and the ground, a second resistor element connected at one end between the connecting point of said first resistor and switch, a third resistor element and a diode connected in parallel to each other and both connected at one side with said second resistor, a capacitor element connected between the other connecting point of said third resistor and diode, and ground, a fourth resistor element connected at one end with said connecting point, a Zener diode connected with said fourth resistor at the cathode side, a solenoid coil connected at one end with the terminal of the switch, PNPN silicon-controlled rectifier having a gate connected with the anode of said Zener diode, an anode of which rectifier is connected with said solenoid coil at the other end, and a cathode of which is connected with the ground, and a warning lamp connected between the terminal and ground.

8. A combination as set forth in claim 6, further including:
a warning lamp for lighting upon reception of electric energy; and
a switch for applying the electric energy to said warning lamp when said bypass valve is moved to said position.

9. A combination as set forth in claim 6, wherein said solenoid valve comprises a first chamber communicating with said vacuum chamber of said hydraulic pressure control means, a second chamber communicating with both said valve control means and the atmosphere, a valve member for providing communication between said first and second chambers, a spring normally biasing said valve member to a position for blocking said communication between said first and second chambers, and a solenoid core for urging said valve member against the action of said spring to a position for establishing said communication between said first and second chambers when actuated by said bypass signal generating means.

10. A combination as set forth in claim 6, wherein said bypass valve control means comprises:
an atmospheric chamber vented to the atmosphere;
a vacuum chamber communicating with said second chamber of said solenoid valve;
a diaphragm dividing said atmospheric and vacuum chambers; and
a spring disposed in said vacuum chamber for biasing said diaphragm apart from said bypass valve.

11. A combination as set forth in claim 10, wherein said bypass valve comprises:
a plunger axially movable therein integrally with said diaphragm of said bypass valve control means and having two grooves formed thereon; and
two conduits formed at a distance from each other in the wall of said bypass valve and opened to the chamber incorporating said plunger, said two conduits communicating respectively with said inlet and outlet of said hydraulic pressure control means, and one of said grooves having an axial length slightly larger than said distance between said two conduits while the other of said grooves being engageable with the extending end of said switch.

12. A combination as set forth in claim 10, wherein said bypass valve comprises:
a plunger axially movable therein integrally with said diaphragm of said bypass valve control means and having two grooves formed thereon;
two conduits formed at a distance from each other in the wall of said bypass valve; and
a toggle valve disposed in a recess formed in the wall of said bypass valve in alignment with one of said conduits; one of said grooves being divided into flat and round portions to which flat portion the other of said conduits is opened, the other of said grooves being engageable with the extending end of said switch, said toggle valve including a valve member seatable at its one end on said one of the conduits and engageable at its other end with said round portion of said one of the grooves and a spring biasing said valve member toward its seated position.